US010428661B2

(12) United States Patent
Thomas et al.

(10) Patent No.: US 10,428,661 B2
(45) Date of Patent: Oct. 1, 2019

(54) TURBINE WHEEL ASSEMBLY WITH CERAMIC MATRIX COMPOSITE COMPONENTS

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US); Aaron D. Sippel, Zionsville, IN (US); Daniel K. Vetters, Indianapolis, IN (US)

(73) Assignees: Roll-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 223 days.

(21) Appl. No.: 15/334,394

(22) Filed: Oct. 26, 2016

(65) Prior Publication Data
US 2018/0112543 A1    Apr. 26, 2018

(51) Int. Cl.
*F01D 5/30* (2006.01)
*F01D 5/28* (2006.01)
*F01D 9/02* (2006.01)
*F01D 11/00* (2006.01)
*F01D 11/02* (2006.01)
*F01D 9/04* (2006.01)

(52) U.S. Cl.
CPC ............ *F01D 5/3015* (2013.01); *F01D 5/282* (2013.01); *F01D 9/02* (2013.01); *F01D 11/003* (2013.01); *F01D 5/303* (2013.01); *F01D 5/3023* (2013.01); *F01D 5/3076* (2013.01); *F01D 9/04* (2013.01); *F01D 11/006* (2013.01); *F01D 11/02* (2013.01); *F01D 11/025* (2013.01); *F05D 2220/32* (2013.01); *F05D 2240/24* (2013.01); *F05D 2240/55* (2013.01); *F05D 2300/6033* (2013.01); *Y02T 50/672* (2013.01)

(58) Field of Classification Search
CPC .......... F01D 5/3015; F01D 5/282; F01D 9/02; F01D 11/003; F01D 5/3023; F01D 5/303; F01D 5/3076; F01D 9/04; F01D 11/005; F01D 11/006; F01D 11/02; F01D 11/025; F05D 2220/32; F05D 2240/24; F05D 2240/55; F05D 2300/6033
USPC .......... 415/174, 174.3; 416/207, 214 R, 215, 416/219 R, 220 R
See application file for complete search history.

(56) References Cited

U.S. PATENT DOCUMENTS

| 3,761,200 | A | * | 9/1973 | Gardiner | ............... F01D 5/3015 |
| | | | | | 415/173.7 |
| 4,094,615 | A | * | 6/1978 | Glenn | ................... F01D 5/3007 |
| | | | | | 416/193 A |
| 4,470,756 | A | * | 9/1984 | Rigo | ..................... F01D 5/3015 |
| | | | | | 416/219 R |
| 5,222,865 | A | | 6/1993 | Corsmeier | |

(Continued)

*Primary Examiner* — Carlos A Rivera
*Assistant Examiner* — Behnoush Haghighian
(74) *Attorney, Agent, or Firm* — Barnes & Thornburg LLP

(57) ABSTRACT

A gas turbine engine includes a turbine section having static turbine vane rings and turbine wheel assemblies. The vane rings are arranged to direct combustion products toward blades included in the turbine wheel assemblies to cause the turbine wheel assemblies to rotate.

14 Claims, 3 Drawing Sheets

(56) References Cited

U.S. PATENT DOCUMENTS

| | | | | |
|---|---|---|---|---|
| 5,277,548 | A  * | 1/1994 | Klein | F01D 11/008 29/889.21 |
| 7,300,253 | B2 | 11/2007 | Beeck et al. | |
| 7,334,983 | B2 * | 2/2008 | Alvanos | F01D 5/081 415/115 |
| 7,540,709 | B1 * | 6/2009 | Ebert | F04D 29/083 415/173.7 |
| 7,931,442 | B1 | 4/2011 | Liang | |
| 8,382,436 | B2 | 2/2013 | Ammann | |
| 8,707,712 | B2 | 4/2014 | Spangler et al. | |
| 8,777,582 | B2 | 7/2014 | Darkins, Jr. et al. | |
| 8,936,440 | B2 | 1/2015 | Alvanos et al. | |
| 2011/0027098 | A1 | 2/2011 | Noe et al. | |
| 2013/0259645 | A1 * | 10/2013 | Bergholz, Jr. | F01D 5/18 415/115 |
| 2014/0286756 | A1 * | 9/2014 | Hile | F01D 5/3015 415/134 |
| 2014/0363279 | A1 * | 12/2014 | Wondrasek | F01D 11/006 415/173.1 |
| 2016/0146024 | A1 * | 5/2016 | Morris | F01D 5/3061 416/96 R |
| 2016/0169024 | A1 * | 6/2016 | Beaujard | F01D 5/3015 416/174 |

* cited by examiner

TURBINE WHEEL ASSEMBLY WITH CERAMIC MATRIX COMPOSITE COMPONENTS

FIELD OF THE DISCLOSURE

The present disclosure relates generally to turbine wheel assemblies adapted for use in gas turbine engines, and more specifically to turbine wheel assemblies having ceramic matrix composite components.

BACKGROUND

Gas turbine engines are used to power aircraft, watercraft, power generators, and the like. Gas turbine engines typically include a compressor section, a combustor, and a turbine section. The compressor section compresses air drawn into the engine and delivers high pressure air to the combustor. In the combustor, fuel is mixed with the high pressure air and is ignited. Hot, high-pressure products of the combustion reaction in the combustor are directed into the turbine section where work is extracted to drive the compressor and, sometimes, an output shaft. Left-over products of the combustion are exhausted out of the turbine and may provide thrust in some applications.

Turbines typically include alternating stages of static vane assemblies and rotating wheel assemblies. Rotating wheel assemblies can be made from disks with a number of blades coupled around a periphery thereof. To withstand hot combustion products from the combustor, designing rotating wheel assemblies that incorporate materials designed to withstand high temperatures is an area of interest. Ceramic matrix composite materials can withstand high temperatures, but present design challenges related to mechanical strength and durability.

SUMMARY

The present disclosure may comprise one or more of the following features and combinations thereof.

A turbine wheel assembly may include a disk, a plurality of blades, and a first face plate. The disk may include metallic materials and may be arranged around a central axis. The plurality of blades may comprise ceramic matrix composite materials. Each of the plurality of blades may include a root, an airfoil, and a platform. The root may be received in a slot formed in the disk to couple the blade to the disk. The airfoil may be arranged radially outward of the disk. The platform may extend circumferentially from the airfoil around a portion of the disk without extending axially forward or axially aft of the airfoil to define a portion of a primary gas path located radially outward of the platform.

The first face plate may be coupled to the disk. The first face plate may include a main ring and a first seal flange. The main ring may be arranged axially adjacent to the roots of the plurality of blades to block movement of the root out of the slots. The first seal flange may extend axially from the main ring adjacent to the platforms of the blades to resist movement of gas into and out of the primary engine gas path.

In some embodiments, the first seal flange of the first face plate may have a radially-outwardly facing surface that is co-radial with an outer surface of the platforms of the blades so as to define another portion of the primary gas path. In some embodiments, the first face plate may include a second seal flange that extends axially from the main ring of the first face plate to resist movement of gas into and out of the primary engine gas path. The second seal flange of the first face plate may be spaced radially from the first seal flange of the first face plate to form an axially-opening channel therebetween.

In some embodiments, the first face plate may include a retainer lip that extends axially from the main ring in a direction opposite the first seal flange.

In some embodiments, the turbine wheel assembly may further include a second face plate coupled to the disk axially-opposite the first face plate. The second face plate may include a main ring and a third seal flange. The main ring of the second face plate may be arranged axially adjacent to the roots of the plurality of blades to block movement of the root out of the slots. The third seal flange may extend axially from the main ring of the second face plate to resist movement of gas into and out of the primary engine gas path.

In some embodiments, the main ring of the second face plate may have a radially-outwardly facing surface that is co-radial with an outer surface of the platforms of the blades to define another portion of the primary gas path. In some embodiments, the third seal flange of the second face plate may be spaced radially inward of the radially-outwardly facing surface of the main ring included in the second face plate.

In some embodiments, the first face plate may be arranged along an axially forward side of the disk so as to face a combustor when the turbine wheel assembly is mounted in a gas turbine engine. The second face plate may be arranged along an axially aft side of the disk so as to face away from the combustor when the turbine wheel assembly is mounted in a gas turbine engine.

In some embodiments, the main ring of the first face plate may have a radially-outwardly facing surface that is co-radial with an outer surface of the platforms of the blades to define another portion of the primary gas path. In some embodiments, the first seal flange of the first face plate may be spaced radially inward of the radially-outwardly facing surface of the main ring included in the first face plate.

In some embodiments, each platform may comprise ceramic matrix composite materials. The first face plate may comprise ceramic matrix composite materials.

According to another aspect of the present disclosure, a turbine section may include a vane ring and a turbine wheel assembly. The vane ring may extend around a central axis. The vane ring may include an outer band, an inner band spaced radially inward of the outer band, and a plurality of vane airfoils that extend from the outer band to the inner band. The turbine wheel assembly may be mounted for rotation about the central axis. The turbine wheel assembly may include a disk comprising metallic materials, a plurality of blades, and a face plate coupled to the disk for rotation therewith. Each of the plurality of blades may include a root, a turbine airfoil, and a platform. The root may be received in a slot formed in the disk to couple the blade to the disk. The turbine airfoil may be arranged radially outward of the disk. The platform may extend circumferentially from the turbine airfoil around a portion of the disk without extending axially forward or axially aft of the turbine airfoil.

The face plate may include a main ring, a seal flange, and a first seal ring. The main ring may be arranged axially adjacent to the roots of the plurality of blades to block movement of the roots out of the slots. The seal flange may extend axially from the main ring. The first seal ring may extend radially outward from the seal flange toward the inner band of the vane ring to establish a seal configured to resist movement of gas into and out of a primary engine gas path defined, in part, by the inner band of the vane ring and the platforms of the blades.

In some embodiments, the first seal ring may be spaced axially from the main ring along the central axis. In some embodiments, the face plate may include a second seal ring that extends radially outward from the seal flange toward the inner band of the vane ring. The second seal ring may be spaced axially from the first seal ring to define a radially-outwardly opening channel therebetween.

In some embodiments, the face plate may include a retainer lip that extends axially from the main ring in a direction opposite the seal flange.

In some embodiments, the face plate may include a plurality of secondary seal rings that extend radially outward from the seal flange toward the inner band of the vane ring. Each of the plurality of secondary seal rings may be spaced axially from the first seal ring.

In some embodiments, the blades may comprise metallic material. The first face plate may comprise ceramic matrix composite materials.

In some embodiments, the inner band of the vane ring may include a gas path member and a static seal ring. The gas path member may define a portion of the primary engine gas path. The static seal ring may extend inward in the radial direction toward the seal flange. The static seal ring may be arranged axially between the seal ring of the face plate and the blade included in the turbine wheel assembly.

According to another aspect of the present disclosure, a turbine wheel assembly may include a plurality of blades, a forward face plate, and an aft face plate. The plurality of blades may comprise ceramic matrix composite materials arranged around a central axis of the turbine wheel assembly. Each of the plurality of blades may include an airfoil, a root, and a platform. The airfoil may have a leading edge and a trailing edge spaced axially apart from the leading edge. The root may be arranged radially inward of the airfoil. The platform may extend circumferentially from the airfoil around a portion of the central axis without extending axially forward of the leading edge or axially aft of the trailing edge of the airfoil.

The forward face plate may include a forward main ring and a forward seal flange. The forward main ring may be arranged axially adjacent to the roots of the plurality of blades. The forward seal flange may extend axially from the forward main ring adjacent to the platforms of the blades. The aft face plate may include an aft main ring and a first aft seal flange. The aft main ring may be arranged axially adjacent to the roots of the plurality of blades. The first aft seal flange may extend axially from the aft main ring adjacent to the platforms of the blades.

In some embodiments, the aft face plate may further include a second aft seal flange that extends axially from the aft main ring. The second aft seal flange may be spaced apart radially from the first aft seal flange. The forward face plate may further include a forward seal ring that extends radially outward from the forward seal flange away from the root of the blade. The forward seal ring may be axially spaced apart from the forward main ring.

These and other features of the present disclosure will become more apparent from the following description of the illustrative embodiments.

DETAILED DESCRIPTION OF THE DRAWINGS

Figure 1:
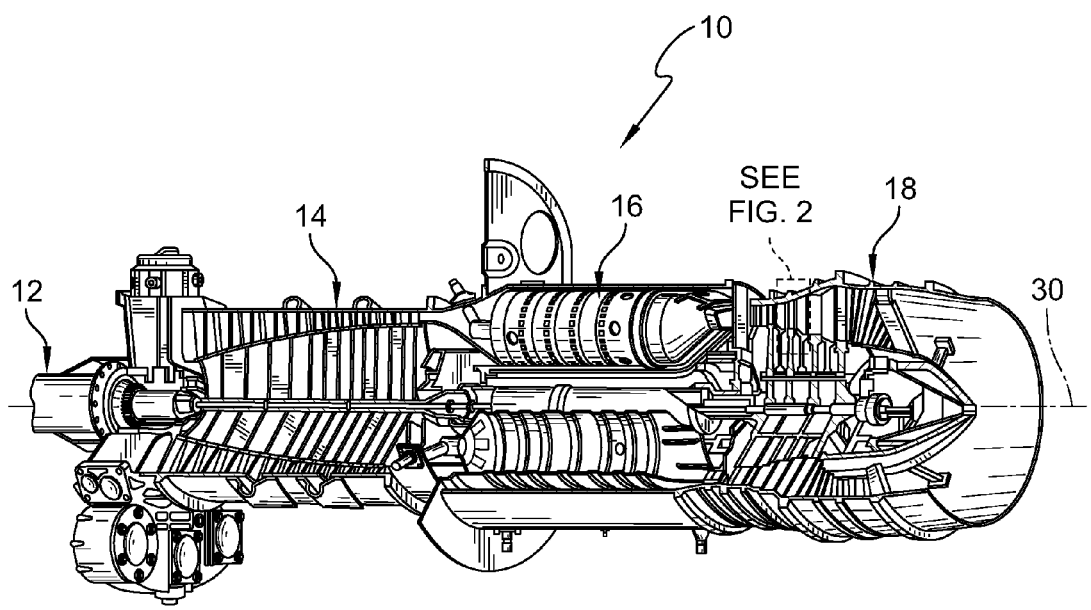
FIG. 1 is a perspective view of an illustrative gas turbine engine cut away to an engine axis of rotation showing that the engine includes a compressor section that compresses air drawn into the engine, a combustor that receives compressed air from the compressor and ignites fuel mixed with the air, and a turbine section through which hot/high-pressure combustion products from the combustor move so that the turbine section can extract work that drives the compressor and an output shaft.

For the purposes of promoting an understanding of the principles of the disclosure, reference will now be made to a number of illustrative embodiments illustrated in the drawings and specific language will be used to describe the same.

An illustrative aerospace gas turbine engine 10 for use in an aircraft is cut-away to show that the engine 10 includes an output shaft 12, a compressor section 14, a combustor 16, and a turbine section 18 as shown in FIG. 1. The compressor section 14 compresses and delivers air to the combustor 16. The combustor 16 mixes fuel with the compressed air received from the compressor section 14 and ignites the fuel. The hot, high-pressure products of the combustion reaction in the combustor 16 are directed into the turbine section 18 and the turbine section 18 extracts work to drive the compressor section 14 and the output shaft 12.

Figure 2:
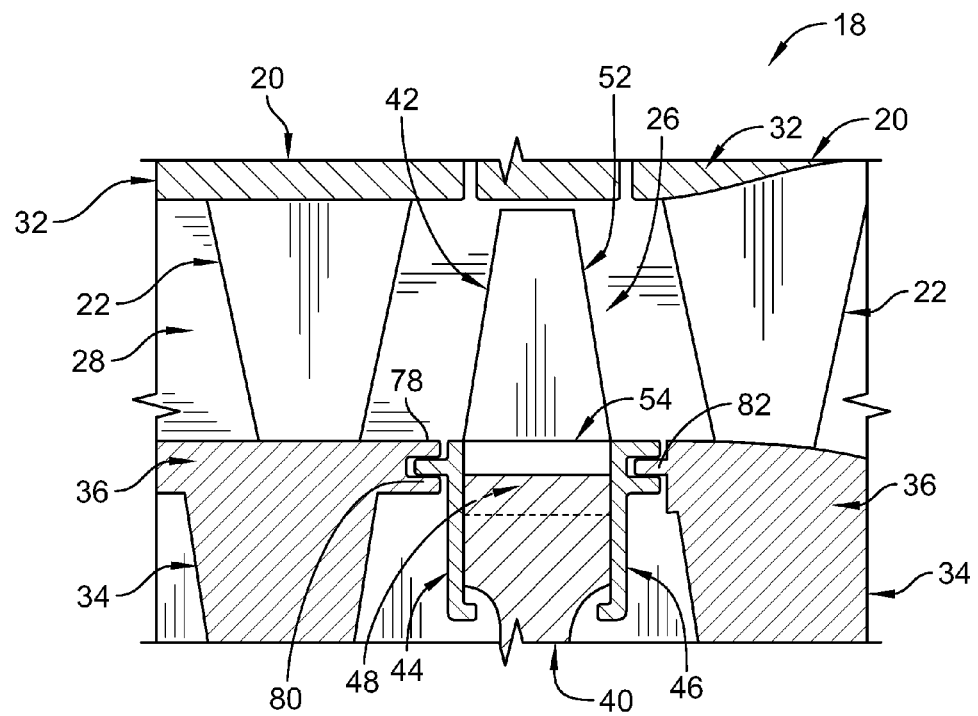
FIG. 2 is a detailed view of a portion of the turbine shown in FIG. 1 illustrating that the turbine includes static vanes that redirect air moving through the turbine and a turbine wheel assembly arranged between the vanes to rotate about the engine axis and further illustrating that features of the static vanes and the turbine wheel assembly cooperate to resist movement of gas into and out of a primary gas path of the engine.

The turbine section 18 illustratively includes static turbine vane rings 20 and corresponding turbine wheel assemblies 26 arranged around a central axis 30 of the engine 10 as shown in FIGS. 1 and 2. Each vane ring 20 includes a plurality of corresponding vane airfoils 22 and each turbine wheel assembly 26 includes a plurality of corresponding blades 42 as shown in FIG. 2. The vane airfoils 22 of the vane rings 20 extend across a gas path 28 of the hot, high-pressure combustion products from the combustor 16 to direct the combustion products toward the blades 42 of the turbine wheel assemblies 26. The blades 42 are, in turn, pushed by the combustion products to cause the turbine wheel assemblies 26 to rotate; thereby, driving the rotating components of the compressor section 14 and the output shaft 12.

The turbine wheel assembly 26 includes a disk 40, the blades 42, a forward face plate 44, and an aft face plate 46 as shown in FIG. 2. Each blade 42 includes a root 50, a turbine airfoil 52, and a platform 54. The root 50 is received in a slot 48 formed in the disk 40 to couple the blade 42 to the disk 40. The turbine airfoil 52 is arranged radially outward of the disk 40. The platform 54 extends circumferentially from the airfoil 52 around a portion of the disk 40 without extending axially forward or axially aft of the airfoil 52 to define a portion of the primary gas path 28 located radially outward of the platform 54.

The face plates 44, 46 are couple to the disk 40 for rotation therewith as suggested in FIG. 2. The forward face plate 44 includes a main ring 60 and a seal flange 62 and the aft face plate 46 includes a main ring 70 and seal flanges 72, 73. The main rings 60, 70 are arranged axially adjacent to the roots 50 of the plurality of blades 42 to block movement of the root 50 out of the slots 48. The seal flanges 62, 72, 73 extend axially from the main rings 60, 70 adjacent to the platforms of the blades 42 to resist movement of gas into and out of the primary engine gas path 28.

Each vane ring 20 includes an outer band 32, an inner band 34, and the plurality of vane airfoils 22 as shown in FIG. 2. The outer band 32 extends circumferentially around the central axis 30. The inner band 34 extends circumferentially around the central axis 30 and is spaced radially inward of the outer band 32. The outer band 32 and the inner band 34 cooperate to define the primary engine gas path 28. The vane airfoils 22 extend across the gas path 28 from the outer band 32 to the inner band 34 to direct the combustion products toward the blades 42 of the turbine wheel assemblies 26.

Figure 3:
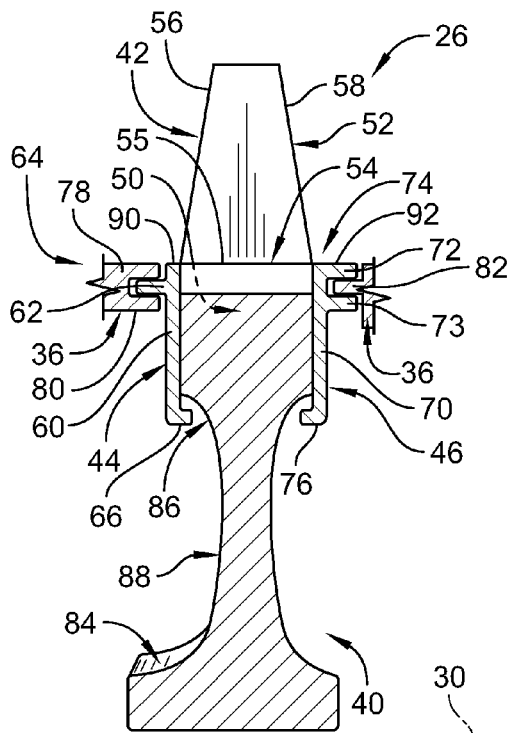
FIG. 3 is a cross-sectional view of the turbine wheel assembly of FIG. 2 showing that the assembly includes a disk comprising metallic materials, a plurality of blades comprising ceramic matrix composite materials formed to include a root received in the disk to couple the blade to the disk and an airfoil that extends radially away from the disk into the primary engine flow path, a forward face plate coupled to the disk and arranged to extend axially forward of the disk and airfoil to resist movement of gas into and out of the primary engine gas path, and an aft face plate coupled to the disk and arranged to extend axially aft of the disk and airfoil to resist movement of gas into and out of the primary engine gas path.

In the illustrative embodiment, the inner band 34 of the vane ring 20 includes a gas path member 36 and inner band vane flanges 78, 80, 82 as shown in FIGS. 2 and 3. The gas path member 36 defines a portion of the primary engine gas path 28. The vane flanges 78, 80, 82 extend in the axial direction toward seal flanges 62, 72, 73 of the turbine wheel assembly 26.

Illustratively, the vane flanges include a first vane flange 78, a second vane flange 80, and a third vane flange 82 as shown in FIGS. 2 and 3. The first vane flange 78 extends aft toward the turbine wheel assembly 26. The second vane flange 80 is radially spaced apart from the first vane flange 78 to define a bird mouth shaped channel arranged to receive a portion of the turbine wheel assembly 26 between the first and second vane flanges 78, 80. The third vane flange 82 is axially spaced apart from the first and second vane flanges 78, 80 and extends axially forward. The third vane flange 82 is received in the turbine wheel assembly 26.

The turbine wheel assembly 26 is mounted for rotation about the central axis 30 as suggested in FIG. 1. The turbine wheel assembly 26 includes the disk 40, the plurality of blades 42, the forward face plate 44, and the aft face plate 46 as shown in FIG. 2. The disk 40 comprises metallic material is arranged to rotate about the central axis 30. Each blade 42 is coupled to the disk 40 for rotation therewith. The forward and aft face plates 44, 46 are coupled to the disk 40 for rotation therewith and are arranged to block axial movement of the blades 42 and to establish seals configured to resist movement of gas into and out of the primary engine gas path 28. In some embodiments, the face plates 44, 46 comprise ceramic matrix composite materials.

In the illustrative embodiment, the disk 40 includes a hub 84 that extends around the central axis 30, a rim 86 arranged radially around the hub 84, and a body 88 that extends between and interconnects the hub 84 and the rim 86 as shown in FIG. 3. The rim 86 is formed to include a plurality of slots 48 arranged to receive the blades 42.

Figure 4:
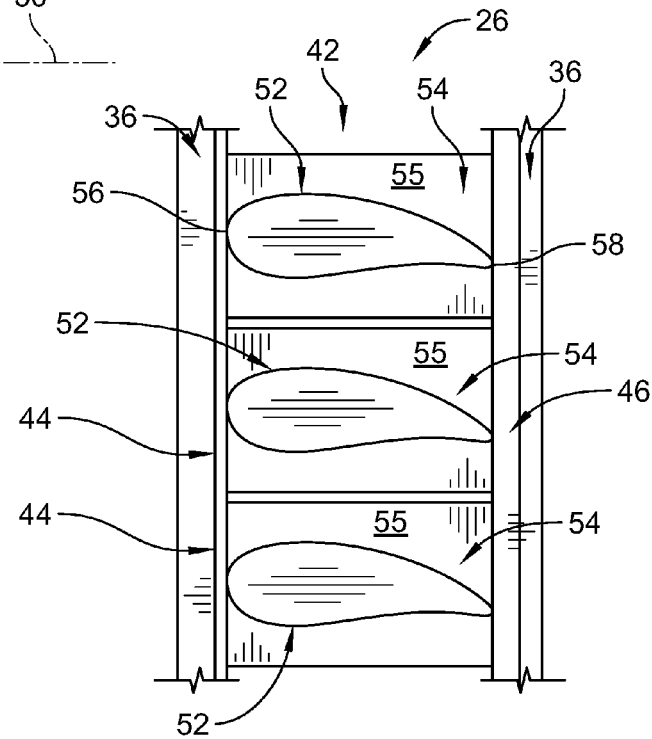
FIG. 4 is a top plan view of a portion of the turbine wheel assembly of FIG. 3 showing that the blades of the turbine wheel assembly include platforms that extend only circumferentially from the airfoils of the turbine blades without extending axially forward or aft of the airfoil.

In the illustrative embodiment, each blade 42 comprises ceramic matrix composite materials and includes the root 50, the turbine airfoil 52, and the platform 54 as shown in FIG. 3. In other embodiments, each blade comprises metallic material. The root 50 is received in a corresponding slot 48 of the disk 40 to couple the blade 42 to the disk 40. The turbine airfoil 52 extends radially away from the disk 40 into the primary engine gas path 28. The platform 54 extends circumferentially from the turbine airfoil 52 around a portion of the disk 40 without extending axially forward or axially aft of the airfoil 52 as shown in FIGS. 3 and 4. The platform 54 has a radially-outwardly facing surface 55 that defines a portion of the primary engine gas path 28 located radially outward of the platform 54 as shown in FIG. 3. Illustratively, the surface 55 is curved and partially cylindrical. In other embodiments, the surface 55 is conical or a spline. In some embodiments, each airfoil 52 comprises metallic material.

The turbine airfoil 52 includes a leading edge 56 and a trailing edge 58 spaced apart axially from the leading edge 56 as shown in FIG. 3. The platform 54 extends circumferentially outward away from the leading edge 56 and the trailing edge 58 without extending axially forward of the leading edge 56 or axially aft of the trailing edge 58 of the turbine airfoil 52 as shown in FIG. 4.

The forward face plate 44 is arranged on an axially forward side of the disk 40 so as to face the combustor 16 when the turbine wheel assembly 26 is mounted in the gas turbine engine 10 as shown in FIG. 2. The forward face plate 44 includes a main ring 60 and a seal flange 62 as shown in FIG. 4.

The main ring 60 is arranged axially adjacent the roots 50 of the blades 42 to block movement of the roots 50 out of the slots 48. Illustratively, the main ring 60 includes a radially-outwardly facing surface 90 that is co-radial with the radially-outwardly facing surface 55 of the platforms 54 to define a portion of the gas path 28. Illustratively, the surface 90 is co-radial and partially cylindrical. In other embodiments, the surface 90 is conical or a spline.

The seal flange 62 extends axially away from the main ring 60 and is received by the first and second inner band vane flanges 78, 80 of the upstream vane ring 20 to establish a forward wheel seal 64. The forward wheel seal 64 is configured to resist movement of gas into and out of the primary engine gas path 28. Illustratively, the seal flange 62 is spaced radially inward of the radially-outwardly facing surface 90 of the main ring 60.

In the illustrative embodiment, the forward face plate 44 further includes a retainer lip 66 as shown in FIG. 3. The retainer lip 66 extends axially from the main ring 60 in a direction opposite the seal flange 62. In the illustrative embodiment, the retainer lip 66 is located radially between the rim 86 and the hub 84 of the disk 40.

The aft face plate 46 is arranged along an axially aft side of the disk 40 so as to face away from the combustor 16 when the turbine wheel assembly 26 is mounted in the gas turbine engine 10 as shown in FIGS. 2 and 3. The aft face plate 46 includes the main ring 70, the outer seal flange 72, and the inner seal flange 73 as shown in FIG. 3. The main ring 70 is arranged axially adjacent the roots 50 of the blades 42 to block movement of the roots 50 out of the slots 48.

The outer seal flange 72 and the inner seal flange 73 each extend axially away from the main ring 70 as shown in FIG. 3. The inner seal flange 73 is spaced radially inward of the outer seal flange 72 to form an axially-opening channel (also called a bird mouth shaped channel) that receives the third inner band vane flange 82 of the upstream vane ring 20 to establish an aft wheel seal 74. The aft wheel seal 74 is configured to resist movement of gas into and out of the primary engine gas path 28.

In the illustrative embodiment, the outer seal flange 72 of the aft face plate 46 has a radially-outwardly facing surface 92 as shown in FIG. 3. The radially-outwardly facing surface 92 is co-radial with the outer surface 55 of the platforms 54 of the turbine blades 42 to define a portion of the gas path 28 and the inner seal flange 73 is spaced radially inward of the radially-outwardly facing surface 92. Illustratively, the surface 92 is co-radial and partially cylindrical. In other embodiments, the surface 92 is conical or a spline. In some embodiments, the shapes of surface 55, 90, 92 match.

In the illustrative embodiment, the aft face plate 46 further includes a retainer lip 76 as shown in FIG. 3. The retainer lip 76 extends axially from the main ring 70 in a direction opposite the seal flanges 72, 73. In the illustrative embodiment, the retainer lip 76 is located radially between the rim 86 and the hub 84 of the disk 40.

Figure 5:
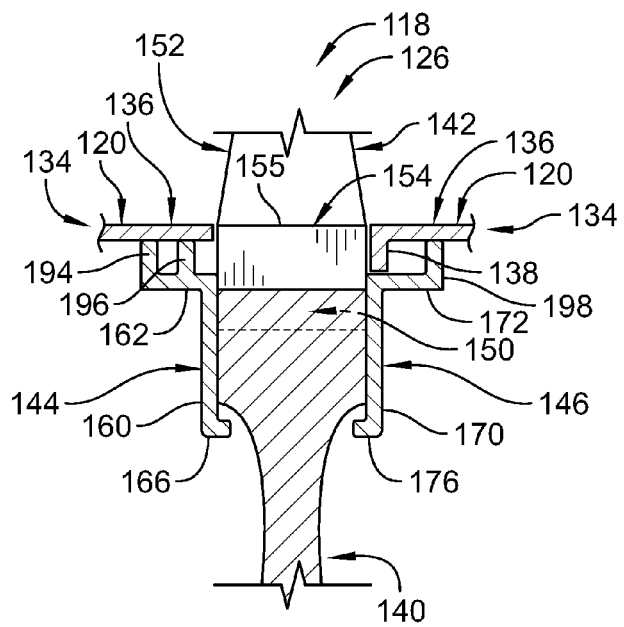
FIG. 5 is a cross sectional view of another turbine wheel assembly included in a turbine with static vanes adapted for use in a gas turbine engine showing that the turbine wheel assembly includes a disk comprising metallic materials, a plurality of blades comprising ceramic matrix composite materials formed to include a root received in the disk to couple the blade to the disk and an airfoil that extends radially away from the disk into the primary engine flow path, a forward face plate coupled to the disk and arranged to extend axially forward of the disk and cooperate with static vane bands to resist movement of gas into and out of the primary engine gas path, and an aft face plate coupled to the disk and arranged to extend axially aft of the disk and cooperate with static vane bands to resist movement of gas into and out of the primary engine gas path.
Figure 6:
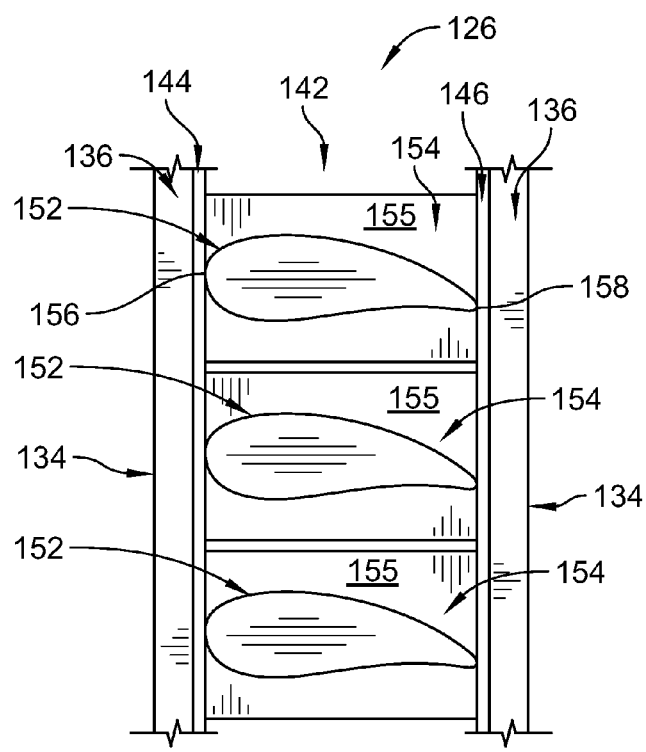
FIG. 6 is a plan view of the turbine wheel assembly of FIG. 5 showing that the blades of the turbine wheel assembly include platforms that extend only circumferentially from the airfoils of the turbine blades without extending axially forward or aft of the airfoil and showing that static vane bands included in a turbine section with the turbine wheel assembly of FIG. 5 define the primary engine gas path forward and aft of the airfoils included in the turbine wheel assembly.

Another embodiment of a turbine section 118 in accordance with the present disclosure is shown in FIGS. 5 and 6. The turbine section 118 is substantially similar to the turbine section 18 shown in FIGS. 1-4 and described herein. Accordingly, similar reference numbers in the 100 series indicate features that are common between the turbine section 18 and the turbine section 118. The description of the turbine section 18 is incorporated by reference to apply to the turbine section 118, except in instances when it conflicts with the specific description and the drawings of the turbine section 118.

The turbine section 118 illustratively includes static turbine vane rings 120 and corresponding turbine wheel assemblies 126 arranged around a central axis 30 of the engine 10 as shown in FIGS. 5 and 6. In the illustrative embodiment, the inner band 134 of the vane ring 120 includes a gas path member 136 and a static seal ring 138 as shown in FIG. 5. The gas path member 136 defines a portion of the primary engine gas path 128. The static seal ring 138 extends in a radial inward direction toward a seal flange 172 of the aft face plate 146.

The turbine wheel assembly 126 includes the disk 140, the plurality of blades 142 coupled to the disk 140, a forward face plate 144, and an aft face plate 146 as shown in FIG. 5. The forward face plate 144 is arranged on an axially forward side of the disk 140 so as to face the combustor 16 when the turbine wheel assembly 126 is mounted in the gas turbine engine 10 as shown in FIG. 2. The aft face plate 146 is arranged along an axially aft side of the disk 140 so as to face away from the combustor 16 when the turbine wheel assembly 126 is mounted in the gas turbine engine 10.

The forward face plate 144 includes a main ring 160, a seal flange 162, a first seal ring 194, and a second seal ring 196 as shown in FIG. 5. The main ring 160 is arranged axially adjacent the roots 150 of the blades 142 to block movement of the roots 150 out of the slots formed in the disk 140. The seal flange 162 extends axially away from the main ring 160. The first and second seal rings 194, 196 extend radially outward from the seal flange 162 toward the inner band 134 of the vane ring 120 to establish a seal configured to resist movement of gas into and out of the primary gas path.

The first seal ring 194 is spaced axially apart from the main ring 160 along the central axis 30 as shown in FIG. 5. The second seal ring 196 is axially spaced from the first seal ring 194 to define a radially-outwardly opening channel therebetween. The seal rings 194, 196 create a restrictive connection to the gas path 28, resulting in less parasitic flow. The restriction may be formed from gas contracting, expanding, contracting, and expanding as it moves through the gap. In some embodiments, the face plate includes the first seal ring 194 and a plurality of secondary seal rings. The secondary seal rings extend radially outward and are axially spaced apart from the first seal ring 194.

In the illustrative embodiment, the forward face plate 144 further includes a retainer lip 166 as shown in FIG. 5. The retainer lip 166 extends axially from the main ring 160 in a direction opposite the seal flange 162. In the illustrative embodiment, the retainer lip 166 is located radially between the rim and the hub of the disk 140.

The aft face plate 146 includes a main ring 170, a seal flange 172, and a seal ring 198 as shown in FIG. 5. The main ring 170 is arranged axially adjacent the roots 150 of the blades 142 to block movement of the roots 150 out of the slots formed in the disk 140. The seal flange 172 extends axially away from the main ring 170. The seal ring 198 extends radially outward from the seal flange 172 toward the inner band 134 of the vane ring 120 to establish a seal configured to resist movement of gas into and out of the primary gas path. The seal ring 198 is spaced axially apart from the main ring 170 along the central axis 30 as shown in FIG. 5. Illustratively, the static seal ring 138 is arranged axially between the seal ring 198 and the blade 142.

In the illustrative embodiment, the aft face plate 146 further includes a retainer lip 176 as shown in FIG. 5. The retainer lip 176 extends axially from the main ring 170 in a direction opposite the seal flange 172. In the illustrative embodiment, the retainer lip 176 is located radially between the rim and the hub of the disk 140.

As shown in FIG. 5, gas path member 136 of the inner band 134 radially overlaps the aft face plate 146. The gas path member 136 is located radially outward of the seal flange 172. The static seal ring 138 is located axially forward of the seal ring 198. In one embodiment, the inner band 134 and the aft face plate 146 are full rings and are assembled sequentially as the engine is stacked front to rear. In another embodiment, the gas path member 136 is included in segmented vanes that are assembled radially inward into position.

In some designs, the platform of a turbine blade defines the inner annulus of the hot gas path through the turbine. As a result, the platform may shield components located radially inward of the gas path such as, for example, a turbine disk or shaft from high gas path temperatures. Such components may be bathed in cooling air that is at a lower temperature and higher pressure than the gas path gases for their survivability.

At least one function of the platform may be to minimize leakage of the higher pressure cooling air into the hot gas path to help maximize engine efficiency. To block leakage, the platforms may extend axially forward and axially aft of the blade's leading and trailing edges, respectively, and interface with adjacent components in a manner so as to minimize air leakage. These interfaces may be complicated because the interface may also accommodate relative movement between the components.

The forward and aft axial extinctions may increase fabrication complexity when fabricating blades using a continuous fiber composite such as, for example, 1-D, 2-D, or 3-D fiber architecture. The present disclosure provides design configurations in which the forward and aft axial extensions are moved from the blades to alternative adjoining components. The adjoining components may have simpler overall geometries than the blades and/or may be fabricated from more traditional material. The re-distribution of the relatively complex features from the blades to the adjacent mating components may result in a system with overall improved manufacturability. In some embodiments, the gas path definition and sealing interface features are added to a turbine wheel cover plate.

In other embodiments according to the present disclosure, stationary annulus face plates (full hoop or segmented) are located forward and aft of the blade. The face plate pieces may be made of CMC or metal. Full hoop embodiments may eliminate intersegment gaps which may result in reduced system leakage. The face plates may be attached to adjacent static structures. In some embodiments, the attachment could be an integral extension of the mating static part. In full hoop embodiments, the part may be free floating and positively located by keying to an adjacent static structure. In some embodiments, the interface between the static annulus face plate and the rotating blade platform could be formed through a combination of features on the wheel cover plate or annulus face plate.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly adapted for use in a turbine section of a gas turbine engine, the turbine wheel assembly comprising a disk comprising metallic materials and arranged around a central axis, a plurality of blades comprising ceramic matrix composite materials, each of the plurality of blades including a root received in a slot formed in the disk to couple the blade to the disk, an airfoil arranged radially outward of the disk, and a platform that extends circumferentially from the airfoil around a portion of the disk without extending axially forward or axially aft of the airfoil to define a portion of a primary gas path located radially outward of the platform, and a first face plate coupled to the disk, the first face plate including a main ring arranged axially adjacent to the roots of the plurality of blades to block movement of the root out of the slots and a first seal flange that extends axially from the main ring adjacent to the platforms of the blades to resist movement of gas into and out of the primary engine gas path, wherein the first seal flange of the first face plate has a radially-outwardly facing surface that is co-radial with an outer surface of the platforms of the blades so as to define another portion of the primary gas path, wherein the main ring of the first face plate has a radially-outwardly facing surface that is co-radial with an outer surface of the platforms of the blades to define another portion of the primary gas path.

2. The turbine wheel assembly of claim 1, wherein the first face plate includes a second seal flange that extends axially from the main ring of the first face plate to resist movement of gas into and out of the primary engine gas path and the second seal flange of the first face plate is spaced radially from the first seal flange of the first face plate to form an axially-opening channel therebetween.

3. The turbine wheel assembly of claim 2, wherein the first face plate includes a retainer lip that extends axially from the main ring in a direction opposite the first seal flange.

4. The turbine wheel assembly of claim 2, further comprising a second face plate coupled to the disk axially-opposite the first face plate, the second face plate including a main ring arranged axially adjacent to the roots of the plurality of blades to block movement of the root out of the slots and a third seal flange that extends axially from the main ring of the second face plate to resist movement of gas into and out of the primary engine gas path.

5. The turbine wheel assembly of claim 4, wherein the main ring of the second face plate has a radially-outwardly facing surface that is co-radial with an outer surface of the platforms of the blades to define another portion of the primary gas path.

6. The turbine wheel assembly of claim 5, wherein the third seal flange of the second face plate is spaced radially inward of the radially-outwardly facing surface of the main ring included in the second face plate.

7. The turbine wheel assembly of claim 6, wherein the first face plate is arranged along an axially forward side of the disk so as to face a combustor when the turbine wheel assembly is mounted in a gas turbine engine and the second face plate is arranged along an axially aft side of the disk so as to face away from the combustor when the turbine wheel assembly is mounted in a gas turbine engine.

8. The turbine wheel assembly of claim 1, wherein each platform comprises ceramic matrix composite materials and the first face plate comprises ceramic matrix composite materials.

9. A turbine section adapted for use in a gas turbine engine, the turbine section comprising a vane ring that extends around a central axis, the vane ring including an outer band, an inner band spaced radially inward of the outer band, and a plurality of vane airfoils that extend from the outer band to the inner band, the inner band of the vane ring includes a gas path member that defines a portion of a primary engine gas path and a static seal ring that extends inward in a radial direction, and a turbine wheel assembly mounted for rotation about the central axis, the turbine wheel assembly including a disk comprising metallic materials, a plurality of blades, and a face plate coupled to the disk for rotation therewith, wherein each of the plurality of blades includes a root received in a slot formed in the disk to couple the blade to the disk, a turbine airfoil arranged radially outward of the disk, and a platform that extends circumferentially from the turbine airfoil around a portion of the disk without extending axially forward or axially aft of the turbine airfoil, and wherein the face plate includes a main ring arranged axially adjacent to the roots of the plurality of blades to block movement of the roots out of the slots, a seal flange that extends axially from the main ring, and a first seal ring that extends radially outward from the seal flange toward the gas path member of the inner band of the vane ring such that the first seal ring is located radially directly inward of the gas path member to establish a seal configured to resist movement of gas into and out of the primary engine gas path defined, in part, by the inner band of the vane ring and the platforms of the blades, wherein the static seal ring of the inner band is arranged axially between the first seal ring of the face plate and the blade included in the turbine wheel assembly and the static seal ring and the first seal ring overlap in the radial direction, wherein the first seal ring is spaced axially from the main ring along the central axis, wherein the face plate includes a plurality of secondary seal rings that extends radially outward from the seal flange toward the inner band of the vane ring and each of the plurality of secondary seal rings are spaced axially from the first seal ring.

10. The turbine section of claim 9, wherein the face plate includes a second seal ring that extends radially outward from the seal flange toward the inner band of the vane ring and that is spaced axially from the first seal ring to define a radially-outwardly opening channel therebetween.

11. The turbine section of claim 10, wherein the face plate includes a retainer lip that extends axially from the main ring in a direction opposite the seal flange.

12. The turbine section of claim 9, wherein the blades comprise metallic material and the face plate comprises ceramic matrix composite materials.

13. A turbine wheel assembly comprising a plurality of blades comprising ceramic matrix composite materials arranged around a central axis of the turbine wheel assembly, each of the plurality of blades including an airfoil having a leading edge and a trailing edge spaced axially apart from the leading edge, a root arranged radially inward of the airfoil, and a platform that extends circumferentially from the airfoil around a portion of the central axis without extending axially forward of the leading edge or axially aft of the trailing edge of the airfoil, the platforms each include a radially-outwardly facing outer surface to define a portion of a primary engine gas path, a forward face plate including a forward main ring arranged axially adjacent to the roots of the plurality of blades and a forward seal flange that extends axially from the forward main ring adjacent to the platforms of the blades, and an aft face plate including an aft main ring arranged axially adjacent to the roots of the plurality of blades and a first aft seal flange that extends axially from the aft main ring adjacent to the platforms of the blades, wherein the first aft seal flange has a radially-outwardly facing surface that is co-radial with the outer surface of the platforms of the blades so as to define another portion of the primary engine gas path.

14. The turbine wheel assembly of claim 13, wherein the aft face plate further includes a second aft seal flange that extends axially from the aft main ring, the second aft seal flange is spaced apart radially from the first aft seal flange, the forward face plate further includes a forward seal ring that extends radially outward from the forward seal flange away from the root of the blade, and the forward seal ring is axially spaced apart from the forward main ring.

* * * * *